United States Patent [19]

Nakatsuka

[11] 4,162,076
[45] Jul. 24, 1979

[54] TONE ARM

[75] Inventor: Hisayoshi Nakatsuka, Mitaka, Japan

[73] Assignee: Namiki Precision Jewel Co., Ltd., Tokyo, Japan

[21] Appl. No.: 859,541

[22] Filed: Dec. 12, 1977

[30] Foreign Application Priority Data

Mar. 30, 1977 [JP] Japan ................................. 52-35621

[51] Int. Cl.² ............................................. G11B 3/14
[52] U.S. Cl. ................................................ 274/23 R
[58] Field of Search ..................................... 274/23 R

[56] References Cited

U.S. PATENT DOCUMENTS 3,963,246  6/1976  Trochimowski .................. 274/23 R

FOREIGN PATENT DOCUMENTS 143357  12/1949  Australia ................................. 274/23

Primary Examiner—Charles E. Phillips
Attorney, Agent, or Firm—Gerald J. Ferguson, Jr.; Joseph J. Baker

[57] ABSTRACT

A tone arm for use in a phonograph record player having a base, the tone arm comprising tone arm shaft having pick up means disposed at one end thereof and a balance weight disposed at the other end thereof, the tone arm shaft having a longitudinal axis extending between the ends thereof, a tone arm shaft holder for pivotally mounting the tone arm shaft with respect to the phonograph record player base about a vertical axis, balance weight mounting means for pivotally mounting the balance weight with respect to the tone arm shaft about a balance weight axis different from the vertical axis about which the tone arm shaft pivots.

9 Claims, 5 Drawing Figures

TONE ARM

BACKGROUND OF THE INVENTION

FIG. 1 illustrates a diagrammatic side view of a conventional tone arm structure. 1 is a balance weight. 2 is an arm shaft holder. 3 is the arm shaft. 4 is a head shell. Pick up for reproducing the sound on the record is accomplished by a pick up cartridge 5 which is fixed to head shell 4. In order to apply suitable needle pressure to cartridge 5, the pressure is adjusted by moving the balance weight along the arm of the freely moving tone arm structure. The fulcrum 0 is in the center of rotation of the arm shaft holder 2. The weight of balance weight 1 must have a gravitational moment which can be in equilibrium with the gravitational moment of the arm shaft 3, the head shell 4 and the cartridge 5 centering on fulcrum 0. In order to reduce the inertial mass of such a tone arm structure, the balance weight 1 should be somewhat heavier and should be positioned somewhat nearer arm shaft holder 2.

FIG. 2 is a side cross-section of the conventional method of affixing balance weight 1. The arm shaft 3 passes tightly through a hole or screw hole in balance weight 1. The balance weight 1 is linked to the tone arm structure and is supported by it. Adjustment of needle pressure of the cartridge is carried out by slight movement along arm shaft 3 of balance weight 1. The position of balance weight 1 after adjustment of the needle pressure is as shown in FIG. 2. In order to find the inertial moment I of balance weight 1 at that time, the following formula is used in which W is the weight of balance weight 1; G is the center of gravity of balance weight 1 and L is the distance from the center of gravity to the fulcrum 0 of the tone arm.

$$I = \overbrace{WL^2}^{A} + \overbrace{I_G}^{B} \qquad (1)$$

The inertial moment denoted by A is the inertial moment value when a body of weight W moves at rotational radius L centered on fulcrum 0. The inertial moment denoted by B is the value when the body moves with the center of gravity G as the center of rotation. FIG. 2 illustrates a configuration of balance weight 1. The $I_G$ of term B in formula (1) is expressed as follows for such a cylindrical shaft whose radius is a and length is l.

$$I_G = (1/12) \, WL^2 \qquad (2)$$

Reference should also be made to Japanese Pat. No. 51-23702 entitled "Moving Control Device of Tone-arm" for illustration of prior art.

SUMMARY OF THE INVENTION

This invention concerns a method of affixing to a tone arm structure a balance weight in which a reduced inertial moment of $I_0$ is realized. The inertial moment $I_G$ corresponding to term B in formula (1) is eliminated and the $I_0$ is as in formula (3).

$$I_0 = WL^2 \qquad (3)$$

It is a further object of this invention to provide an improved tone arm with free axial support in which the inertial moment of the balance weight thereof is reduced through the use of a pivot axis which differs from the pivot axis of the tone arm structure, the balance weight pivot axis preferably being at or near the center of gravity of the balance weight.

Other objects and advantages of this invention will be apparent from a reading of the following specification and claims taken with the drawing.

DETAILED DESCRIPTION OF PREFERRED EMBODIMENTS OF THE INVENTION

Figure 1:
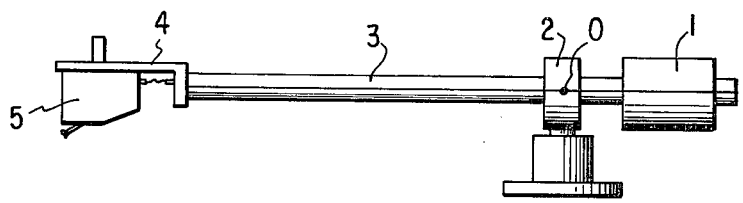
FIG. 1 is a side view of a conventional tone arm structure.
Figure 2:
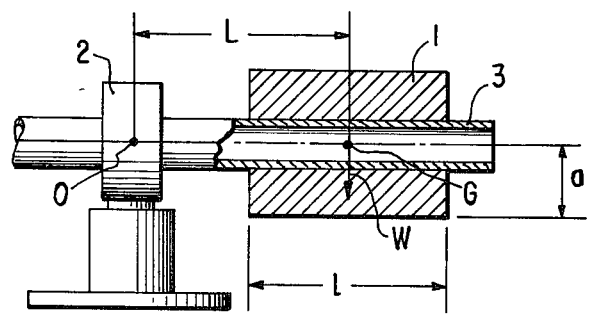
FIG. 2 is a side cross-sectional view showing the method of affixing the balance weight of FIG. 1.

In the drawing like reference numerals refer to like parts.

Figure 3:
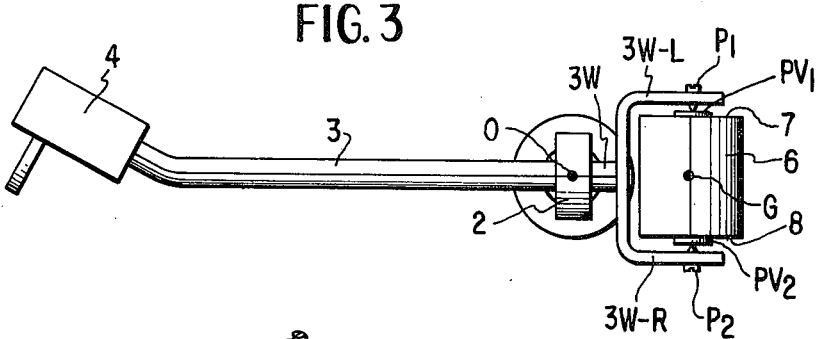
FIG. 3 is a plan view showing in principle an illustrative tone arm according to this invention.

In FIG. 3, 2 is the arm shaft holder; 3 is the arm shaft; 4 is the head shell; 5 is the pick up cartridge; 6 is a balance weight in accordance with this invention; 7, 8 are shaft support surfaces of balance weight 6; 3W is the arm shaft portion which supports balance weight 6; 3W-L, 3W-R are arm sections of arm shaft 3W; $PV_1$ and $PV_2$ are bearings attached to balance weight 6; $P_1$ and $P_2$ are pivot shafts attached to arms 3W-L and 3W-R; 0 is the fulcrum of the tone arm; and G is the center of gravity of balance weight 6.

Pivot bearings $PV_1$ and $PV_2$ are provided near or at the centers of the opposite surfaces 7 and 8 of cylindrical balance weight 6, the center lines of these bearings preferably being co-linear. Arms 3W-L and 3W-R comprise a yoke and have pivot shafts $P_1$ and $P_2$ affixed thereto. Pivots $P_1$ and $P_2$ are arranged with a central line connecting their center axes and the direction of this central line should be horizontal and preferably parallel to or co-linear with the center line of pivot bearings $PV_1$ and $PV_2$. This central line should also preferably be perpendicular to and intersect the direction of the arm shaft 3. The pivots $P_1$ and $P_2$ smoothly engage pivot bearings $PV_1$ and $PV_2$ of balance weight 6. Thus balance weight 6 is linked to the tone arm structure and is supported thereby. The position of axial support of balance weight 6 should preferably be arranged so that the center of gravity G of balance weight 6 lies on the center line of pivot bearings $PV_1$ and $PV_2$. However, the operation of this invention is not affected even when center of gravity G does not lie on the center line of the pivot bearings.

As indicated above, by use of the foregoing balance weight support mechanism, the position of balance weight 6 is shifted in relation to the rotational component of arm shaft 3, the latter preferably directly intersecting the central line between pivots $P_1$ and $P_2$. However, the balance weight itself cannot shift around its center of gravity. Hence, the A term in formula (1) remains while the foregoing shift in the position of weight 6 with respect to shaft 3 eliminates the B term corresponding to $I_G$. While a mass of the same weight as a conventional balance weight would be used, the tone arm of this invention has a lighter effective moving mass since the dynamic inertial moment can be reduced as shown in formula (3). Thus, problems associated with conventional tone arms are eliminated. Hence, the Q value of resonance at the resonance point which accompanies rise in the reproduction resonance frequency of the tone arm is reduced and reproduction of unnecessary excess reproduction static from warps in records by the cartridge is prevented.

Figure 4:
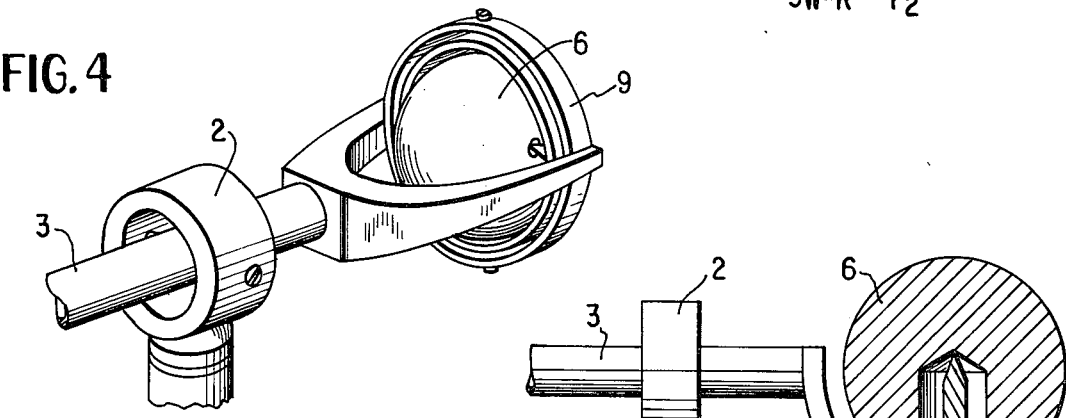
FIG. 4 is a perspective view of an illustrative embodiment in which a balance weight is affixed by gimbal support.
Figure 5:
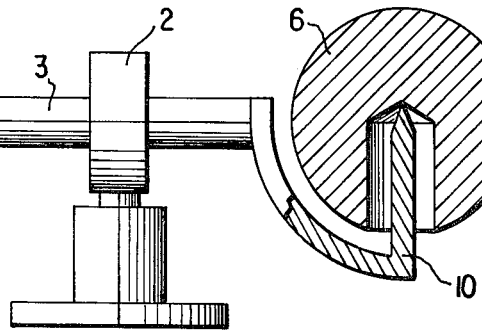
FIG. 5 is a partial cross-sectional view of an illustrative embodiment in which the balance weight is affixed by one point support.

The structure shown in FIG. 3 is one embodiment in which the effective moving mass of the tone arm is reduced in relation to vibration in the perpendicular direction of the arm shaft 3 and the effective mass can be reduced in relation to vibration in the vertical or horizontal direction by the same principle. FIGS. 4 and 5 illustrate embodiments of this. FIG. 4 illustrates an embodiment in which a spherical balance weight 6 is supported by a gimbal type bearing 9 just like a gyro compass. FIG. 5 illustrates in lateral cross-section a spherical balance weight 6 is supported by a one point support bearing 10. Any arbitrary balance weight shape may be employed including a cylinder, rectangle, sphere, etc. The method of adjusting needle pressure with the foregoing balance weight with reduced inertial mass may include, in FIG. 3, for example, a mechanism (not shown) disposed on arm shaft 3W which would shift the structure including arms 3W-L and 3W-R and balance 6 in the direction of the arm shaft 3, where the shifting mechanism may correspond to that conventionally used to shift balance weight 1 of FIG. 1.

What is claimed is:

1. A tone arm for use in a phonograph record player having a base, said tone arm comprising
    tone arm shaft having pick up means disposed at one end thereof and a balance weight disposed at the other end thereof, said tone arm shaft having a longitudinal axis extending between said ends thereof,
    a tone arm shaft holder for pivotally mounting said tone arm shaft with respect to the phonograph record player base about a vertical axis, and
    balance weight mounting means for pivotally mounting said balance weight with respect to said tone arm shaft about a balance weight axis which substantially intersects said longitudinal axis of the tone arm shaft and is spaced from said vertical axis about which the tone arm shaft pivots where the center of gravity of said balance weight lies substantially on said balance weight axis.

2. A tone arm as in claim 1 where said balance weight axis is substantially orthogonal to the longitudinal axis of the tone arm shaft.

3. A tone arm as in claim 2 where said balance weight axis is substantially orthogonal to the vertical axis about which the tone arm pivots.

4. A tone arm shaft as in claim 2 where said balance weight axis is substantially parallel to the vertical axis about which the tone arm pivots.

5. A tone arm as in claim 1 where said balance weight mounting means includes gimbal means mounted on said tone arm shaft, the balance weight being spherically shaped and pivotally mounted in the gimbal means.

6. A tone arm as in claim 1 where said balance weight includes a point pivot attached to said tone arm shaft, the direction of the point pivot being substantially parallel to the vertical axis about which the tone arm shaft pivots and the balance weight being spherically shaped and having a hole partially extending therein, said point pivot supporting the balance weight at the bottom of said hole.

7. A tone arm for use in a phonograph record player having a base, said tone arm comprising
    tone arm shaft having pick up means disposed at one end thereof and a balance weight disposed at the other end thereof, said tone arm shaft having a longitudinal axis extending between said ends thereof where the center of gravity of said balance weight intersects said longitudinal axis of the tone arm shaft,
    a tone arm shaft holder for pivotally mounting said tone arm shaft with respect to the phonograph record player base about a vertical axis, and
    balance weight mounting means for pivotally mounting said balance weight with respect to said tone arm shaft about a balance weight axis which is spaced from said vertical axis about which the tone arm shaft pivots and which is substantially orthogonal to the longitudinal axis of the tone arm shaft.

8. A tone arm for use in a phonograph record player having a base, said tone arm comprising
    tone arm shaft having pick up means disposed at one end thereof and a balance weight disposed at the other end thereof, said tone arm shaft having a longitudinal axis extending between said ends thereof,
    a tone arm shaft holder for pivotally mounting said tone arm shaft with respect to the phonograph record player base about a vertical axis, and
    balance weight mounting means for pivotally mounting said balance weight with respect to said tone arm shaft about a balance weight axis spaced from said vertical axis about which the tone arm shaft pivots and where said balance weight mounting means includes a yoke mounted on said tone arm shaft, the balance weight being cylindrically shaped and pivotally mounted between the arms of said yoke.

9. A tone arm shaft as in claim 8 where said balance weight axis is substantially orthogonal to the longitudinal axis of the tone arm shaft.

* * * * *